United States Patent
de Swardt

(10) Patent No.: US 11,916,448 B2
(45) Date of Patent: Feb. 27, 2024

(54) SMALL-FRACTION NANOPARTICLE RESIN FOR ELECTRIC MACHINE INSULATION SYSTEMS

(71) Applicant: The Timken Company, North Canton, OH (US)

(72) Inventor: Jan de Swardt, Eustis, FL (US)

(73) Assignee: The Timken Company, North Canton, OH (US)

(*) Notice: Subject to any disclaimer, the term of this patent is extended or adjusted under 35 U.S.C. 154(b) by 95 days.

(21) Appl. No.: 17/495,215

(22) Filed: Oct. 6, 2021

(65) Prior Publication Data

US 2022/0247288 A1    Aug. 4, 2022

Related U.S. Application Data

(60) Provisional application No. 63/144,157, filed on Feb. 1, 2021.

(51) Int. Cl.
| | | |
|---|---|---|
| *C08J 5/24* | (2006.01) | |
| *B32B 27/20* | (2006.01) | |
| *B32B 27/38* | (2006.01) | |
| *H02K 15/12* | (2006.01) | |
| *H02K 3/30* | (2006.01) | |
| *H02K 15/10* | (2006.01) | |
| *B29C 70/86* | (2006.01) | |
| *C08K 7/18* | (2006.01) | |
| *C09J 163/00* | (2006.01) | |
| *B29K 105/16* | (2006.01) | |
| *B29L 31/00* | (2006.01) | |
| *B29K 709/10* | (2006.01) | |

(52) U.S. Cl.
CPC ........... *H02K 15/12* (2013.01); *B29C 70/86* (2013.01); *C08J 5/245* (2021.05); *C08K 7/18* (2013.01); *H02K 3/30* (2013.01); *H02K 15/105* (2013.01); *B29K 2105/162* (2013.01); *B29K 2709/10* (2013.01); *B29L 2031/748* (2013.01); *C08J 2363/00* (2013.01)

(58) Field of Classification Search
None
See application file for complete search history.

(56) References Cited

U.S. PATENT DOCUMENTS

| | | |
|---|---|---|
| 7,989,704 B2 | 8/2011 | Bessede et al. |
| 8,937,128 B2 | 1/2015 | Spitz et al. |
| 9,275,775 B2 | 3/2016 | Bjorklund et al. |
| 9,771,464 B2 | 9/2017 | Gröppel et al. |
| 9,884,950 B2 | 2/2018 | Brockschmidt et al. |
| 9,938,405 B2 | 4/2018 | Ootake |
| 9,984,796 B2 | 5/2018 | Gröppel et al. |
| 10,479,857 B2 | 11/2019 | Gröppel et al. |
| 2005/0096423 A1 | 5/2005 | Jennrich et al. |
| 2007/0141324 A1 | 6/2007 | Stevens et al. |
| 2014/0138008 A1 | 5/2014 | Gröppel et al. |
| 2014/0326481 A1 * | 11/2014 | Groppel ............... H01B 19/04 174/120 C |
| 2014/0353000 A1 * | 12/2014 | Yin ........................ H01B 3/04 156/185 |
| 2019/0156968 A1 | 5/2019 | Gautschi et al. |
| 2019/0190341 A1 | 6/2019 | Beisele et al. |
| 2019/0225741 A1 | 7/2019 | Beisele et al. |
| 2020/0220409 A1 | 7/2020 | Huber et al. |

FOREIGN PATENT DOCUMENTS

| | | | |
|---|---|---|---|
| EP | 1568667 A2 * | 8/2005 | ........... A61K 6/0094 |
| WO | 2013041363 A1 | 3/2013 | |
| WO | 2017178195 A1 | 10/2017 | |

OTHER PUBLICATIONS

Machine translation of EP-1568667-A2 (no date).*

* cited by examiner

*Primary Examiner* — Michael J Feely

(74) *Attorney, Agent, or Firm* — Michael Best & Friedrich LLP

(57) ABSTRACT

An insulation system of a current-carrying conductor of an electric machine. The insulation system comprises a thermally curable resin including a polymer resin matrix and a nanoparticulate filler. A mica paper or mica tape is impregnated with the thermally curable resin. The thermally curable resin comprises nanoparticulate filler, the total quantity of nanoparticulate filler being at least 0.1 wt % and not more than 0.5 wt %.

6 Claims, 1 Drawing Sheet

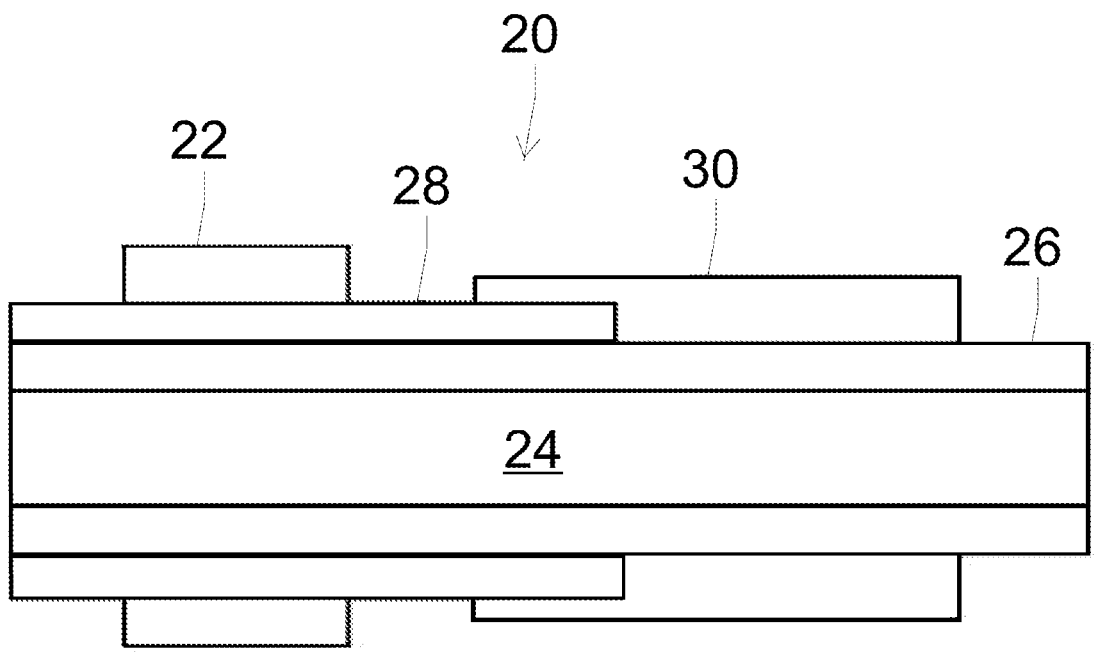

SMALL-FRACTION NANOPARTICLE RESIN FOR ELECTRIC MACHINE INSULATION SYSTEMS

CROSS-REFERENCE TO RELATED APPLICATIONS

This application claims priority to U.S. Provisional Patent Application No. 63/144,157, filed on Feb. 1, 2021, the entire contents of which are incorporated by reference herein.

BACKGROUND

The insulation system used to electrically insulate an electric winding in an electric machine from nearby conductive surfaces or parts may be subject to mechanical forces. These forces may damage or break the insulation over a period of time. Usually mechanical strength of the insulation system can be improved with the addition of mechanical braces, however this may reduce the capability for transferring heat out of the winding, in addition to adding cost and increasing the physical size of the equipment.

The electric machine insulation system typically is provided by a mica paper or mica tape impregnated with resin. It is known to use nanoparticulate fillers in a polymer resin material in order to reduce the propensity for the insulation to degrade in its electrical insulating performance over time. Cavities located between the individual particles in the mica paper are filled with resin. The combination of impregnating resin and carrier material of the mica provides the mechanical strength of the insulation. Electrical insulation performance is achieved through myriad solid-solid interfaces in the mica used. The layering of organic and inorganic materials forms microscopic interfaces whose resistance to partial discharge and thermal stresses is determined by the properties of the mica platelets. As a result of the Vacuum Pressure Infusion (VPI) process, even very small cavities in the insulation must be fully filled with resin, in order to minimize the number of internal gas-solid interfaces. For the additional improvement of the resistance, the use of nanoparticulate fillers has been proposed and used in industry—see for example WO2013/041363, the entire contents of which are incorporated by reference herein.

A disadvantage of some known nanoparticulate-filled resins is the rapid degradation of the polymeric matrix on exposure to partial discharge. As the polymer breaks down, the nanoparticulate filler becomes exposed at the surface of the insulation. In one solution to this problem, it is suggested by U.S. Pat. No. 9,984,796, the entire contents of which are incorporated by reference herein, that the resin incorporates at least two different fractions of nanoparticles that differ significantly in their particle diameter. However, this results in the need to source, handle, and process numerous different types of nanoparticulate filler for even a single, uniform type of commercial product. U.S. Pat. No. 9,984,796 suggests a nanoparticulate filler having a particle size of between 10 and 50 nm in a concentration of 10 to 50 wt % in the synthetic resin, together with a fraction of nanoparticulate filler having a particle size of between 1 and 5 nm in a concentration between 1 and 10 wt %.

In another example of a prior solution to incorporate nanoparticulate filler into electric machine insulation of thermally curable epoxy resin, U.S. Patent Application Publication No. 2019/0225741, the entire contents of which are incorporated by reference herein, suggests the use of both micro and nano particles used together in admixture where the amounts of nano particles preferably range from about 1 up to about 40% by weight based on the total weight of the thermally curable epoxy resin formulation, more preferably from about 5 to about 20% by weight, in particular from about 5 to about 15% by weight. While this can achieve certain objectives of performance, it introduces substantial cost and complexity in doing so.

SUMMARY

In some aspects, the invention provides an insulation system of a current-carrying conductor of an electric machine. The insulation system comprises a thermally curable resin including a polymer resin matrix and nanoparticulate filler, and a mica paper or mica tape impregnated with the thermally curable resin. The thermally curable resin comprises nanoparticulate filler, the total quantity of nanoparticulate filler being at least 0.1 wt % and not more than 0.5 wt %.

In some aspects, the invention provides a method for producing an insulation system on a current-carrying conductor within an electric machine. The method includes providing a mica paper or mica tape, and wrapping the current-carrying conductor with the mica paper or mica tape. The method further includes providing a polymer resin comprising nanoparticulate filler thoroughly mixed therein. The total quantity of nanoparticulate filler is at least 0.1 wt % and not more than 0.5 wt %. The mica paper or mica tape is fully impregnated with the polymer resin, and the polymer resin that impregnates the mica paper or mica tape is thermally cured.

Other aspects of the embodiments will become apparent by consideration of the detailed description and accompanying drawings.

BRIEF DESCRIPTION OF THE DRAWINGS

The drawing is a schematic view of an exemplary insulation system on a current-carrying conductor of an electric machine.

Other aspects of the embodiments described herein will become apparent by consideration of the detailed description.

DETAILED DESCRIPTION

Mica tape is known in the art as a tape made of mica paper, natural phlogopite, calcined muscovite or synthetic mica, glued with resin to the substrate of glass fiber or polyethylene as the basis for the insulation system of an electric machine. Epoxy, polyester or silicone polymer resins are most commonly used to bond mica paper to the tape substrate. Vacuum Pressure Impregnated (VPI), high dielectric tapes are used for the main insulation of low and high voltage electric machine current-carrying conductors, sometimes referred to as the main wall insulation. According to one aspect of the present disclosure, mica paper or mica tape of a main insulation 26 is placed around the current-carrying conductors 24 (e.g., wire windings, coils, bars) of the electric machine 20 to provide a covering that insulates the conductors 24 against each other and/or against other electrically conductive parts of the machine 20. Beyond the main insulation 26 additional separate layers may be provided as part of the overall insulation system. The mica tape is fixed to the conductors 24 by a matrix resin system, which is cured to provide a solid polymer mass interpenetrating the mica tape that surrounds the conductors 24. As such, the mica tape along with the cured resin provides the finished main insulation 26 that goes into service with the electric machine 20. As one example, the resin-impregnated mica tape can insulate a stator coil. According to the present disclosure, the resin can be a polymer resin such as epoxy, silicone, or polyester. The resin can, in some constructions, take the form of a unique blend of epoxy resins, novolac epoxy and epoxy diluents catalyzed using Lewis Acid Latent technology blended with specific nanoparticles to offer improved mechanical, electrical and environmental protection. Examples of commercially available resins that can be used in accordance with the present disclosure include, but are not limited to those in the following table.

| Supplier | Resin Name | Resin Type |
| --- | --- | --- |
| VonRoll USA, Inc. Schenectady, NY | Permafil ® 74038 | Epoxy |
|  | Permafil ® 74041 | Thixotropic epoxy |
|  | Permafil ® 74050T | Thixotropic epoxy |
| Elantas PDG, Inc. Olean, NY | Pedigree ® 4000F VTC | Epoxy copolymer |
|  | Pedigree ® 433-75 VTC | Polyester |
|  | Epoxylite ® 006-0841 | Epoxy |
|  | Epoxylite ® E 477 | Epoxy |
|  | Epoxylite ® E 478 Thixo | Thixotropic epoxy |
|  | ELAN-Volt ® EX 51302 | Epoxy copolymer |
|  | RanVar ™ R2003 VTC | Epoxy copolymer |
| AEV, Ltd. Birkenhead, Wirral (UK) | ULTIMEG ™ U2050L | Epoxy |
|  | ULTIMEG ™ U2020 | Epoxy |
|  | ULTIMEG ™ U2002HVR | Epoxy |
|  | ULTIMEG ™ U2220 | Epoxy |

By using nanoparticles inside the insulation system, particularly in the resin that impregnates the mica tape to form the main insulation 26, the mechanical strength of the main insulation 26 can be improved without any increase in physical size and an insignificant reduction in thermal transfer capabilities. These technical factors allow the electric machine 20 having the insulation system to achieve higher rating potential, longer expected lifespan, or both. In particular, thermal conductivity should remain high so that heat transfers easily from the current-carrying conductors 24 to the environment to enable high current flow without inducing undue thermal stress of the main insulation 26, which is known to result in decomposition and destruction of the insulation material. The main insulation 26 according to the present disclosure also exhibits a low dielectric dissipation factor at operating temperatures, such that heating of the insulation material is limited to reduce the corresponding thermal stress.

The FIGURE of the present disclosure schematically illustrates a portion of an electric machine 20 including a stator core 22 along with a current-carrying conductor 24. The conductor 24 can be in the form of a bar or coil and can be built-up of numerous internal strands, each of which has its own strand insulation (not shown), which is separate from the main insulation. The main insulation layer 26, and particularly the thermally curable polymer resin used in the manufacture thereof, is the subject of the present disclosure. The main insulation 26 is applied directly to the (insulated) current-carrying conductor 24. One or more additional layers may be provided on the conductor 24, outside the primary layer of the main insulation 26. For example, the FIGURE schematically illustrates a corona armor tape layer 28, along with a stress grading tape layer 30.

As prefaced above, the main insulation 26 is manufactured by providing a mica tape, wrapping the conductor 24 with the mica tape, placing the wrapped conductor 24 in an impregnation cavity, applying internal vacuum to the wrapped conductor 24 within the cavity, inserting a curable polymer resin into the evacuated impregnation cavity containing the wrapped conductor, and thermally curing the resin to form the main insulation. The curing can include the application of heat and optionally positive pressure. Prior to inserting the curable polymer resin into the impregnation cavity, the curable polymer resin is formulated, which includes thoroughly mixing nanoparticulate filler into the base polymer resin. The amount of nanoparticulate filler is kept small, further protecting against poor mixing or settling within the base polymer resin. The total quantity of nanoparticulate filler in the thermally curable resin is at least 0.1 wt % and not more than 0.5 wt %. Yet, even with this small quantity of the nanoparticulate filler, the resin has shown an increase of over 25% in bond strength (e.g., 28.4% increase in bond strength).

Suitable nanoparticles for the nanoparticulate filler to the polymer resin matrix can include a metal-oxide or semi-metal oxide particle type. For example, the nanoparticles can be aluminum oxide ($Al_2O_3$), also known commonly as "alumina," or alternately silicon dioxide. Both of these may be relatively erosion resistant for the cured main insulation 26. Nanoparticles are defined as those having at least one dimension (e.g., diameter in the case of spheres) that is less than More particularly, the nanoparticles can have an average particle size in the range of 1 nm up to 100 nm, in some cases 20 nm or less or 10 nm or less. In one example, the polymer resin matrix is epoxy resin and the nanoparticulate filler therein consists of alumina nanoparticles of an average particle size of 6 nm, in a quantity of 0.5 wt %. Nanoparticles, according to their particle size, have a particularly high surface area-to-volume ratio, which helps these particles demonstrate markedly different characteristics than the same material would exhibit on a particle scale one or more orders of magnitude larger.

Along with the polymer resin matrix and the nanoparticulate filler, one or more additional additives and/or fillers can be included in the thermally curable resin that is provided to impregnate the mica paper or mica tape. For example, the thermally curable resin can include any one or more of: one or more hardeners, one or more adhesion promoters, one or more wetting agents, one or more curing initiators, one or more tougheners, and one or more microparticulate thermal conductivity aides. Microparticles are defined as those having an average particle size of 1 µm or more and less than 1000 µm. Microparticles, if present in the resin formulation for the main insulation layer 26, can be present in an amount of 1 wt % to 40 wt %. In some embodiments, the resin includes microparticulate pigment (e.g., under 250 µm, under 200 µm, or under 180 µm). The pigment makes it easier for the operators of the VPI process to identify the height of the resin in the tank during the process. The pigment enables easy visual inspection for the operators of the VPI process to identify the height of the resin in the tank during the process and thus other more complicated means of measuring the resin height, for instance Hydrostatic devices, Magnetostrictive Level Transmitters, Magnetic Level Gauges, Capacitance Transmitters, Ultrasonic Level Transmitters, Laser Level Transmitters, Radar Level Transmitters, are not needed and may be dispensed with.

The insulation systems according to the invention are particularly suitable for use in the manufacture of rotors or stators of electrical generators or motors, in particular of large generators or motors.

Various features and advantages of the embodiments are set forth in the following claims.

What is claimed is:

1. An insulation system of a current-carrying conductor of an electric machine, the insulation system comprising:
- a thermally curable resin including a polymer resin matrix, one or both of a hardener and a curing initiator, and a nanoparticulate filler, wherein the polymer resin matrix comprises epoxy resin and the nanoparticulate filler consists of metal oxide or semi-metal oxide particles having an average size of 20 nm or less; and
- a mica paper or mica tape impregnated with the thermally curable resin,
- wherein the total quantity of nanoparticulate filler in the thermally curable resin is 0.1 wt %.

2. The insulation system of claim 1, wherein the nanoparticulate filler consists of $Al_2O_3$.

3. The insulation system of claim 2, wherein the nanoparticulate filler consists of $Al_2O_3$ spheres.

4. The insulation system of claim 1, wherein the thermally curable resin further comprises microparticulate pigment for coloration.

5. The insulation system of claim 1, wherein the insulation system is a stator coil insulation system.

6. A method for producing an insulation system on a current-carrying conductor within an electric machine, the method comprising:
- providing a mica paper or mica tape;
- wrapping the current-carrying conductor with the mica paper or mica tape;
- providing a resin comprising a polymer resin matrix, one or both of a hardener and a curing initiator, and a nanoparticulate filler thoroughly mixed therein, wherein the polymer resin matrix comprises epoxy resin and the nanoparticulate filler consists of metal oxide or semi-metal oxide particles having an average particle size of 20 nm or less, the total quantity of nanoparticulate filler in the resin being 0.1 wt %;
- fully impregnating the mica paper or mica tape with the resin; and
- thermally curing the resin that impregnates the mica paper or mica tape.

* * * * *